H. W. GRIGGS.
MACHINE FOR WINDING MOVING PICTURE FILMS AND OTHER MATERIAL.
APPLICATION FILED JAN. 26, 1912.
1,042,430.
Patented Oct. 29, 1912.
3 SHEETS—SHEET 1.
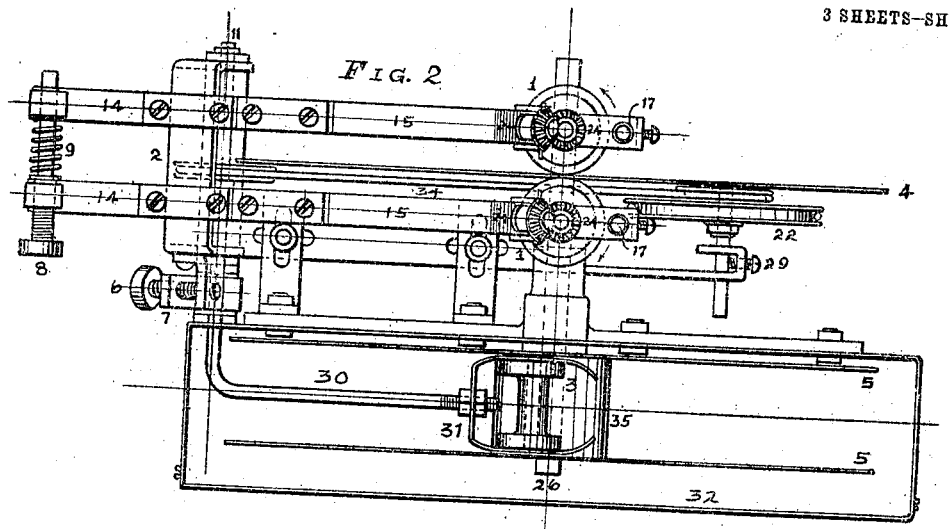
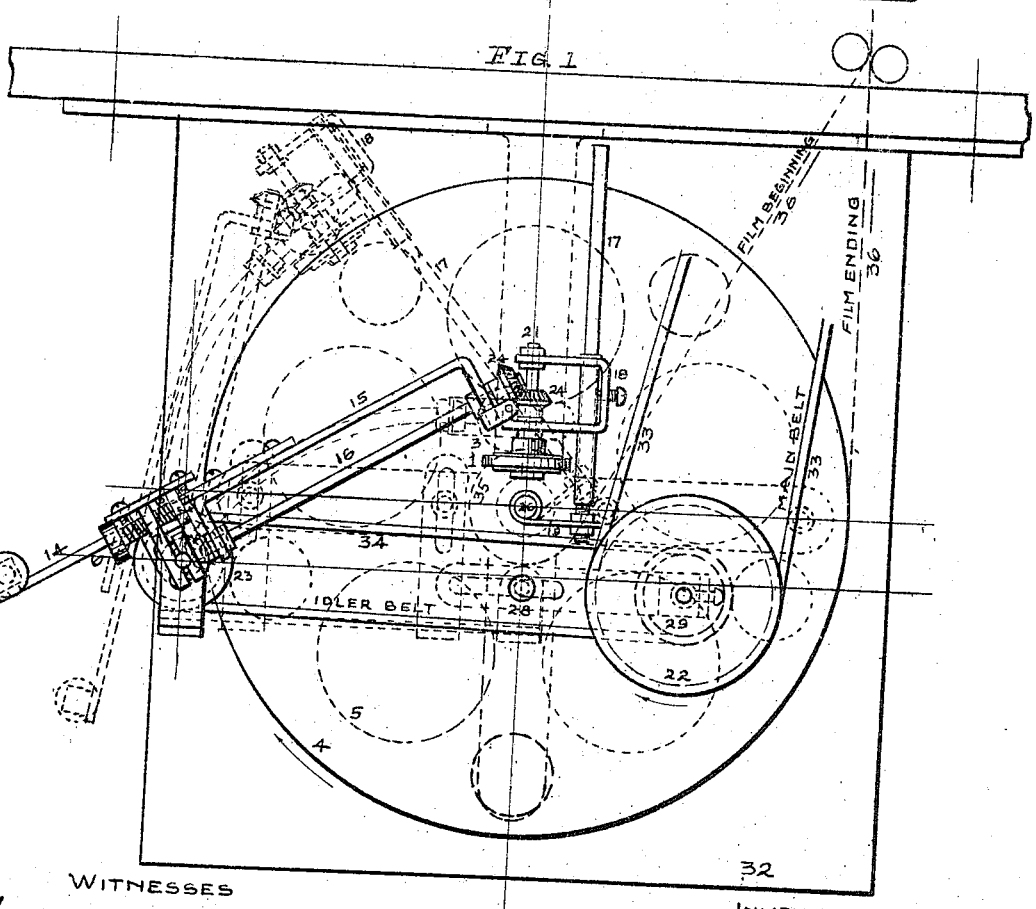
WITNESSES
INVENTOR H. W. GRIGGS.
MACHINE FOR WINDING MOVING PICTURE FILMS AND OTHER MATERIAL.
APPLICATION FILED JAN. 26, 1912.
1,042,430.
Patented Oct. 29, 1912.
3 SHEETS—SHEET 2.
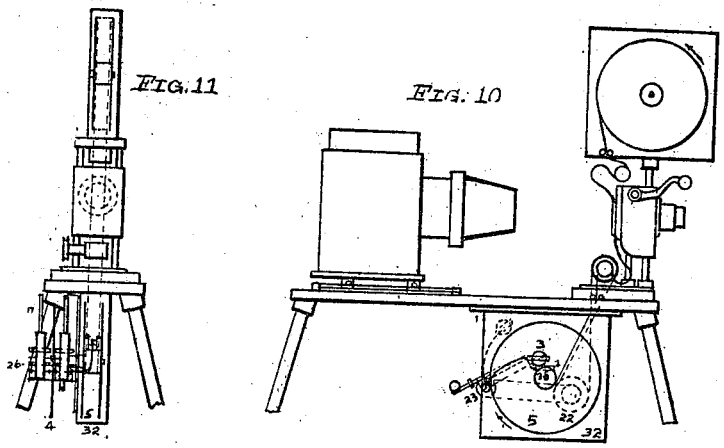
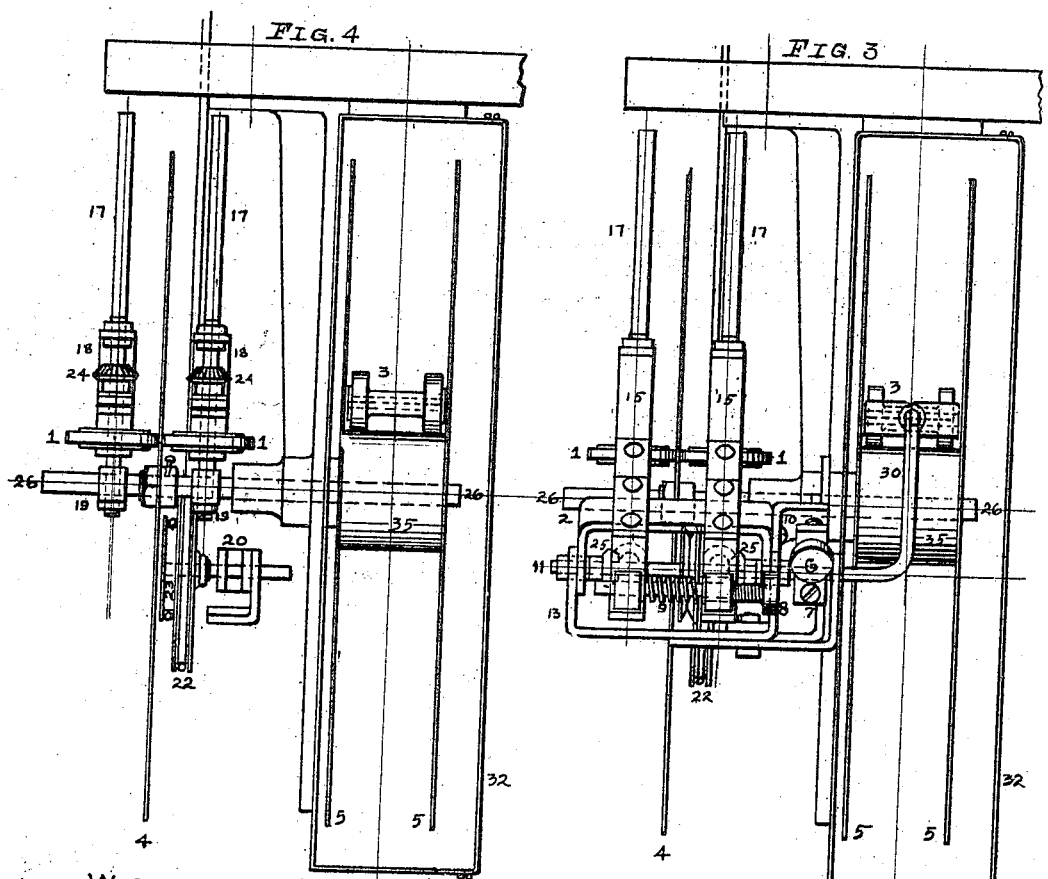

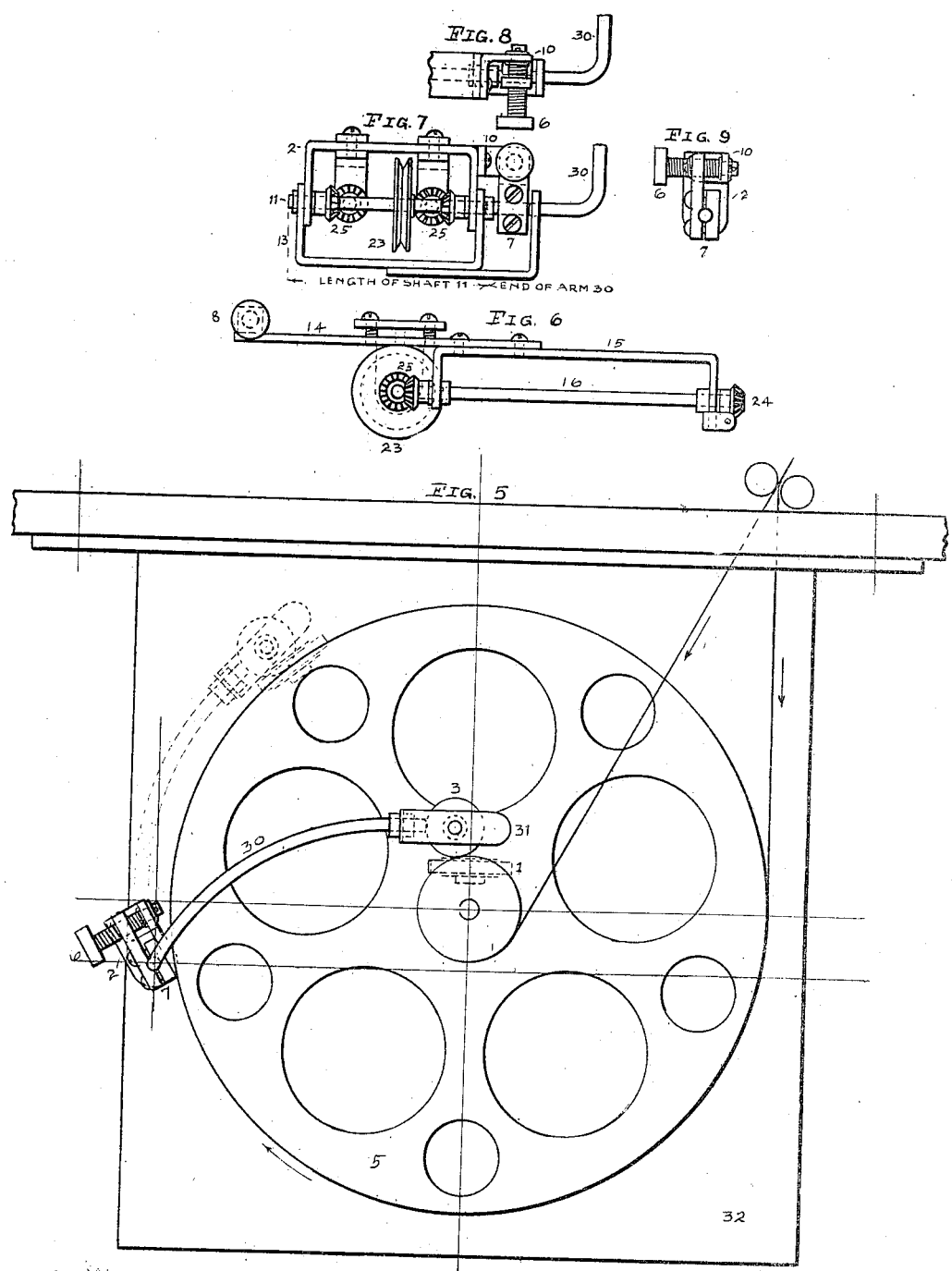

UNITED STATES PATENT OFFICE.

HORACE W. GRIGGS, OF MILWAUKEE, WISCONSIN.

MACHINE FOR WINDING MOVING-PICTURE FILMS AND OTHER MATERIAL.

1,042,430.

Specification of Letters Patent.

Patented Oct. 29, 1912.

Application filed January 26, 1912. Serial No. 673,515.

*To all whom it may concern:*

Be it known that I, HORACE W. GRIGGS, a citizen of the United States, residing at Milwaukee, county of Milwaukee, and State of Wisconsin, have invented new and useful Improvements in Machines for Winding Moving-Picture Films and other Material, of which the following is a specification.

My improvement relates to improvements in apparatus for winding material, and more particularly for winding moving picture films at a uniform tension from beginning to end of wind, regardless of the speed of the driving mechanism, or the increasing in diameter of the roll.

My invention is further explained by reference to the accompanying drawings in which—

Figure, 1, is a side view thereof. Fig. 2, is a top view. Fig. 3, is an end view. Fig. 4, is an end view of the main shaft and attachments with a portion of the mechanism removed. Fig. 5, is a side view of the reel and contact arms, contact rollers, and tension adjusting spring and clamps. Fig. 6, is a detailed view of the friction arms, friction shaft, and friction gears. Fig. 7, is a detail view of the friction yoke and gears, tension clamp, and contact arm, Fig. 8, is a top view of friction clamp. Fig. 9, is an end view of tension clamp. Figs. 10 and 11, show how the device is applied to a kinematograph, or moving picture machine.

Like parts are referred to by the same reference numerals throughout the several views.

The film 36, is secured at one end to the hub 35, of the reel 5, and motion is communicated from the driving belt 33 to said reel through the pulley 23, shaft 11, miter gears 25, 25 (shafts 16, 16, miter gears 24, 24, shafts 21, 21, friction gears 1, 1, friction disk 4, and shaft 26 upon which shaft said reel 5 is supported.

22, is an idler for supporting the belt 33, and idler belt 34.

It will be understood that the friction gears 1, 1, which bear against the side of the disk 4, are carried from the center toward the periphery of said disk 4, by the action of the contact roller 3, against the gradually increasing film, motion being communicated from said film roll to said friction gears through the arm 30, tension clamp 7, swivel 10, yoke 2, arms, 14, 14, and 15, 15, radial pivots 20, 20, and yokes 18, 18, upon which yokes 18, 18, said friction gears 1, 1, are carried. It will also be understood that the supports for the friction gears comprising said arms 14, 14, and 15, 15, and yoke 2, are supported from and are adapted to describe an arc of a circle concentric with the driving shaft 11.

17, 17, are radial guide bars which are supported on one end from the reel shaft 26, by brackets 19, 19, and are slidably connected with yokes 18, 18, by which yoke the shafts 21, 21, miter gears 24, 24, and friction gears 1, 1, are supported whereby the friction gears 1, 1, are retained at right angles to the radius of the reel.

It will be understood that the tension of film 36, may be increased or diminished as it is being wound upon the reel 5, by changing the relative position of the friction gears 1, 1, and bearing roller 3, to each other, that this change in the relative position of said gears and rollers is attained by turning the screw 6, in the clamp 7, and swivel 10, carried by the yoke 2, that by turning said screw from, the tension of the film is increased, and by a reverse movement of said screw the tension is slackened.

The contact guards 31, prevent the contact rollers 3, from catching in the openings of the reel. As the film is being wound on the reel, the contact rollers 3, and their supporting arm 30, are carried outward by the increasing coil of film of the film from near the center of the reel as shown in full lines in Figs. 1, and 5, to near the periphery of said reel as shown in dotted lines in said figures, when the rollers 3 are brought to the starting position. A uniform pressure is maintained thereon by the tension spring 9, and the tension of said spring is adapted to be increased or diminished by the screw 6.

Having described my invention, what I claim as new and desire to secure by Letters Patent, is:—

1. In a film winding reel, a friction gear for driving said reel, a contact roller for the film, said gear and roller being adjustable with respect to each other, a guide bar for holding said gear tangent to the roll, and an adjustable spring for holding the gear in driving position.

2. In a film winding device, a reel shaft, a disk attached thereto, movable friction gears on each side of said disk supported by arms pivoted on a power shaft, a lever attached to the power shaft by a divided contact arm, and carrying rollers for engagement with the film winding upon said reel, clamping means for adjusting said lever relatively to the friction gears, radial guide bars for the gear arms, and an adjusting screw and spring for regulating the pressure of the gears against the disk.

3. In a winding apparatus and tension equalizer for kinematograph films, a winding shaft, a disk attached thereto, friction gears for said disk, a power transmission pulley and shaft for the gears, radial guide arms for the gears, and a contact arm for the winding film angularly adjustable on said pulley shaft whereby tension of film may be varied.

In testimony whereof I affix my signature in the presence of two witnesses.

HORACE W. GRIGGS.

Witnesses:
JAS. B. ERWIN,
I. D. BREMER.